United States Patent
Marszalek

(10) Patent No.: US 9,475,090 B2
(45) Date of Patent: Oct. 25, 2016

(54) SYSTEM AND METHOD FOR PROVIDING A REFLECTIVE COATING INSIDE A TIRE

(71) Applicant: Sennco Solutions, Inc., Plainfield, IL (US)

(72) Inventor: Christopher Marszalek, Plainfield, IL (US)

(*) Notice: Subject to any disclaimer, the term of this patent is extended or adjusted under 35 U.S.C. 154(b) by 298 days.

(21) Appl. No.: 14/075,083

(22) Filed: Nov. 8, 2013

(65) Prior Publication Data
US 2015/0132478 A1 May 14, 2015

(51) Int. Cl.
| | |
|---|---|
| B05D 1/02 | (2006.01) |
| B05D 7/22 | (2006.01) |
| B29D 30/06 | (2006.01) |
| B60C 13/00 | (2006.01) |
| B05D 7/24 | (2006.01) |
| B05B 13/06 | (2006.01) |
| B05B 15/06 | (2006.01) |
| B65D 83/14 | (2006.01) |
| B60C 29/06 | (2006.01) |

(52) U.S. Cl.
CPC ............... *B05D 7/22* (2013.01); *B05B 13/06* (2013.01); *B05B 15/066* (2013.01); *B05D 1/02* (2013.01); *B05D 7/24* (2013.01); *B29D 30/06* (2013.01); *B29D 30/0681* (2013.01); *B60C 13/001* (2013.04); *B60C 29/062* (2013.04); *B65D 83/756* (2013.01); *B29D 2030/0682* (2013.01)

(58) Field of Classification Search
CPC    B29D 30/06; B29D 2030/728; B60C 13/00; B60C 13/001; B05D 1/02; B05D 7/22; B05D 7/24
USPC ................................. 427/230, 231, 233, 236
See application file for complete search history.

(56) References Cited

U.S. PATENT DOCUMENTS

| | | | | |
|---|---|---|---|---|
| 2,320,042 | A * | 5/1943 | McMahan .................... | 137/319 |
| 3,729,041 | A * | 4/1973 | Kubota ........................ | 152/523 |
| 5,472,031 | A * | 12/1995 | Austin ......................... | 152/415 |
| 8,197,897 | B2 * | 6/2012 | Shibata et al. .............. | 427/236 |
| 2001/0004924 | A1 * | 6/2001 | Aoki et al. .................. | 156/394.1 |
| 2009/0107578 | A1 * | 4/2009 | Trachtenberg et al. ......... | 141/5 |

OTHER PUBLICATIONS

"Ride-On Auto Formula Installation and Usage Instructions," © 2008 Inovex Industries, Inc., 4 pages.*
"Installation of Ride-On TPS Using ROTIS Pump," © 2005 Inovex Industries, Inc., 4 pages.*
Material Safety Data Sheet (MSDS) for Ride-On Tire Protection System (TPS) Tire Sealant, Apr. 27, 2006, 5 pages.*
"Pneuma Seal: The Original Tire Sealant," Technical Product Overview © 2005 Kor-Chem, Incorporated, 19 pages.*

* cited by examiner

*Primary Examiner* — William Phillip Fletcher, III
(74) *Attorney, Agent, or Firm* — Lempia Summerfield Katz LLC

(57) ABSTRACT

A system and a method provide a coating on an interior surface of a tire. A valve connects to the interior of the tire. The method connects a source of coating material to the valve, propels the coating material through the valve, and applies the coating material to the interior of the tire. The system has a source of a coating material connected to the valve. A propellant causes delivery of the coating material through the valve into the tire. Another method coats an interior of a tire mounted on a rim. The method connects a first end of a tube to a source of coating material and inserts the second end of the tube into the interior of the tire encircling the rim. The coating material moves through the tube into the tire. The tube is withdrawn from the tire moving along the interior circumference of the tire.

13 Claims, 7 Drawing Sheets

SYSTEM AND METHOD FOR PROVIDING A REFLECTIVE COATING INSIDE A TIRE

BACKGROUND OF THE INVENTION

The present invention relates to tires and more specifically, to a system and a method for providing a reflective coating inside a tire.

Millions of vehicles travel on public roadways every day and every night. Most trucks have more than four tires. Typically, tractor/trailers, also known as 18-wheelers, may have 18 or more tires. Unfortunately, tire blowouts frequently occur for various reasons. For example, poorly maintained and/or underinflated tires, old tires, damaged tires and/or the like may be especially prone to blowouts. On many occasions, when a flat tire may occur, the tire may shred and/or disintegrate into pieces.

Tires and/or parts of tires from trucks, trailers and/or various other vehicles may become road hazards when the tires are damaged. For example, the tire may be punctured, rupture, delaminate and/or disintegrate into pieces and become scattered on a roadway. The tires and/or parts of tires may present dangers to other drivers. In particular, the dangers presented may be multiplied in severity by the inability to see the tires and/or parts of tires at night on a roadway. Typical tire composition materials, such as vulcanized rubber and/or synthetic rubber, for example, are not reflective to light. The typical black color of the tire may make the tire virtually invisible at night.

Thus, the driver of a vehicle may be unable to see the tires and/or parts of tires at night despite the illumination generated by the headlights of the vehicle on the road ahead of the vehicle. A collision with the tires and/or parts of tires may cause damage to the vehicle upon encountering the tires and/or parts of tires. Even worse, the collision and/or the avoidance of the tires and/or parts of tires may cause an accident for the vehicle causing harm to the driver and/or others.

Another common problem may occur on busy roadways. Highly congested roadways with many vehicles may decrease the ability of a driver to see an upcoming road hazard, such as tires and/or parts of tires littering the roadway. The obstructions and/or interference presented by the tires and/or parts of tires may be unavoidable to drivers encountering the tires and/or parts of tires due to a lack of reaction time.

A need, therefore, exists for a system and/or a method which may be used to provide a reflective coating inside a tire. Also, a need exists for a system and/or a method which may be used to provide a reflective coating inside a tire which may be performed in a simple manner by any individual on any tire.

SUMMARY OF THE INVENTION

The present invention relates to tires and more specifically, to a system and a method for providing a reflective coating inside a tire.

To this end, in an embodiment of the present invention, a method for coating a tire is provided. The tire may have a valve connected to an interior of the tire and a valve core located in the valve. The method may have the steps of: connecting a source of coating material to the valve; propelling the coating material through the valve; and applying the coating material to the interior of the tire.

In an embodiment, the coating material may be reflective to light.

In an embodiment, the coating material may be a colorant.

In an embodiment, the coating material may be fluorescent.

In an embodiment, the method may have the step of removing the valve core from the valve before connecting the source of coating material to the valve.

In an embodiment, the method may have the step of inserting the source of the coating material through the valve.

In an embodiment, the method may have the step of moving the tire to disperse the coating material within the interior of the tire.

In an embodiment, the source of the coating material may be a pressurized container.

In an embodiment, the method may have the steps of connecting a tube to the source of coating material and inserting the tube into the valve.

In an embodiment, the method may have the step of pressurizing the source of the coating material.

In an embodiment, the method may have the step of atomizing the coating material.

In an embodiment of the present invention, a system for coating a tire is provided. The tire may have a valve providing access to an interior of the tire. The system may have a source of a coating material connected to the valve and a propellant. The propellant may cause the source of the coating material to deliver the coating material through the valve and into the interior of the tire.

In an embodiment, the source of the coating material may be a pressurized canister.

In an embodiment, the system may have a tube having a first end and a second end. The second end may be located in a position opposite to the first end. The first end of the tube may be connected to the source of the coating material, and the second end of the tube may be connected to the valve.

In an embodiment, the system may have a tube having a first end and a second end. The second end may be located in a position opposite to the first end. The first end of the tube may be connected to the source of the coating material, and the second end of the tube may be inserted through the valve into the interior of the tire.

In an embodiment, the system may have a tube having a first end and a second end. The second end may be located in a position opposite to the first end. The first end of the tube may be connected to the source of the coating material. A directional sprayer may be located at the second end of the tube. The directional sprayer may be inserted through the valve into the interior of the tire.

In an embodiment, the system may have a colorant combined with the source of the coating material.

In a further embodiment of the present invention, a method of coating an interior of a tire mounted on a rim is provided. The method may have the step of connecting a first end of a tube to a source of coating material. The tube may have a second end located in a position opposite to the first end of the tube. The tube may have a length defined from the first end to the second end. The method may have the steps of inserting the second end of the tube into the interior of the tire wherein the tube encircles the rim; transferring the coating material from the source of coating material through the length of the tube into the interior of the tire; and withdrawing the tube from the tire wherein the tube moves along a circumference of the interior of the tire.

In an embodiment, the tire may have a valve providing access to the interior of the tire. The method may have the step of inserting the second end of the tube through the valve into the interior of the tire.

In an embodiment the method may have the step of attaching a directional sprayer to the second end of the tube.

It is, therefore, an advantage of the present invention to provide a system and a method for providing a reflective coating inside a tire.

Another advantage of the present invention is to provide a system and a method for providing a reflective coating inside a tire which may require a minimal amount of time to perform.

Yet another advantage of the present invention is to provide a system and a method for providing a reflective coating inside a tire which may require minimal effort to perform.

A still further advantage of the present invention is to provide a system and a method for providing a reflective coating inside a tire which may be operated by a single user.

A further advantage of the present invention is to provide a system and a method for providing a reflective coating inside a tire which is capable of coating the inside of tires of any size and/or type.

An advantage of the present invention is to provide a system and a method for providing a reflective coating inside a tire which is comprised of materials and/or components that do not harm the tire.

Another advantage of the present invention is to provide a system and a method for providing a reflective coating inside a tire which may be used without affecting the performance of the tire while in use.

A further advantage of the present invention is to provide a system and a method for providing a reflective coating inside a tire which may remain in the tire indefinitely.

Moreover, an advantage of the present invention is to provide a system and a method for providing a reflective coating inside a tire which may coat the complete interior surface of the tire.

Another advantage of the present invention is to provide a system and a method for providing a reflective coating inside a tire which is portable.

Yet another advantage of the present invention is to provide a system and a method for providing a reflective coating inside a tire which may coat the interior of the tire in a color other than black.

Still further, an advantage of the present invention is to provide a system and a method for providing a reflective coating inside a tire which is inexpensive.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
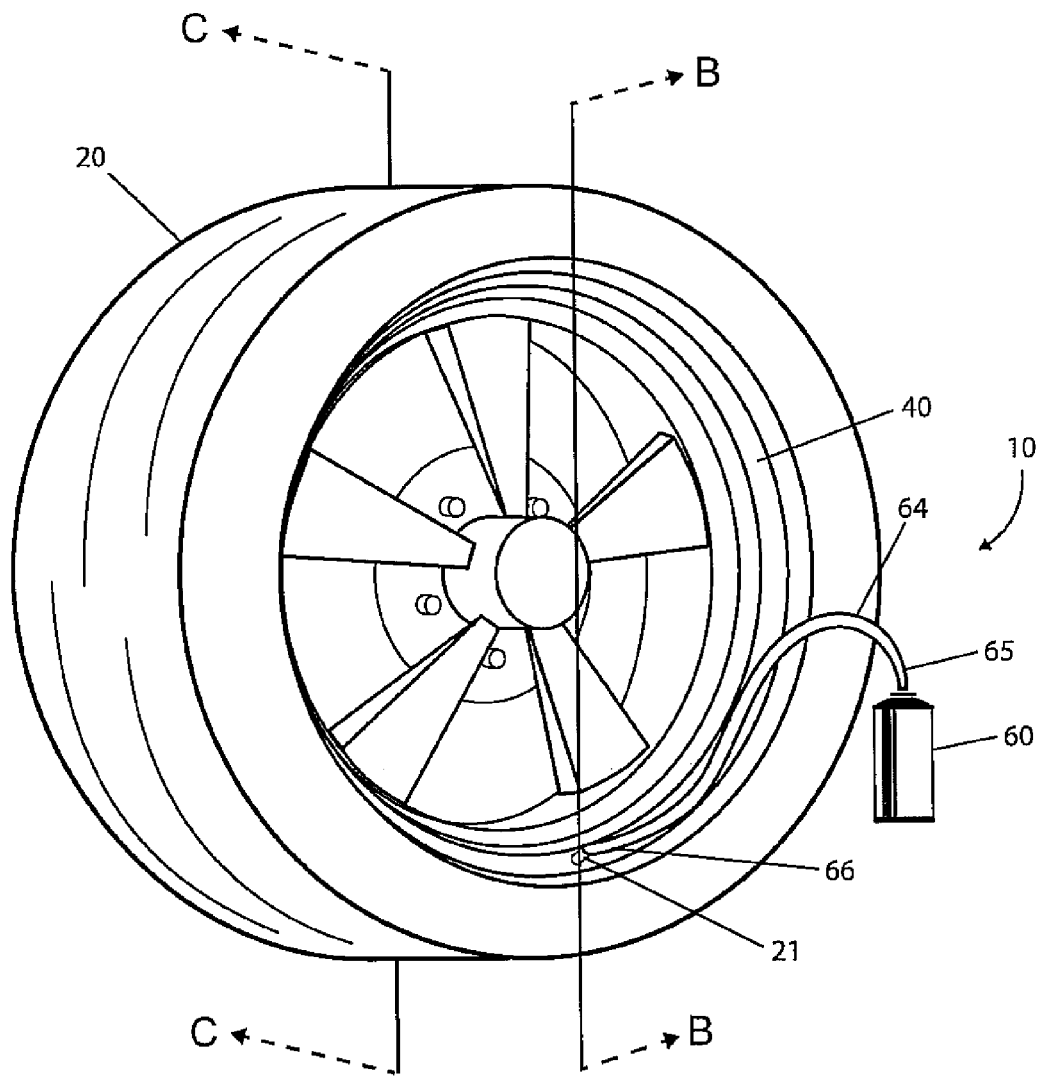
FIG. 1 illustrates a side view of a tire coating system with a tire and a rim in accordance with embodiments of the present invention.

The present invention relates to a system and a method for coating an interior of a tire. Referring now to the drawings, wherein like numerals refer to like parts, FIGS. 1 and 5-9 illustrate embodiments of a system 10 for providing a coating 15 on an interior surface 17 of a tire 20. The system 10 may be used to coat at least a portion of the interior surface 17 of the tire 20.

In an embodiment, the coating 15 may be reflective, fluorescent and/or otherwise reactive to incident light. The coating may be a type of light-activated chemical, colorant, paint, pigment, dye, stain, polymer coating and/or the like. The coating 15 may have sodium fluorescein, or some similar fluorescent or phosphorescent material as an additive to produce the effect of reflection and/or fluorescence.

Typically, the tire 20 and/or parts of the tire 20 may become a road hazard when the tire 20 may become damaged. For example, the tire 20 may be punctured, rupture, delaminate and/or disintegrate into pieces and may become scattered on a roadway. The tire 20 and/or parts of the tire 20 may present a dangerous obstacle to other drivers. In particular, the danger presented may be multiplied in severity by the inability to see the tire 20 and/or parts of the tire 20 at night on a roadway. The black color of the exterior of the tire 20 may make the tire 20 virtually invisible at night.

Thus, the tire 20 may fail and parts of the tire 20 may become scattered on the roadway. Parts of the interior surface 17 of the tire 20 treated with the system 10 and/or method of the present invention may be visible on the roadway, since light from the headlights of an oncoming vehicle may be incident on the coating 15 on the interior surface 17 of the tire 20. The incident light of the headlights may cause a desired reflection and/or fluorescence of the coating 15 on the interior surface 17 of the tire 20. Thus, a motorist may be able to avoid the obstacle caused by the damaged tire 20 and/or parts of the tire 20. The reflective nature and/or visibility of the coating 15 of the interior surface 17 of the tire 20 may allow sufficient reaction time for the motorist to steer clear of the tire 20 and prevent an accident and/or damage to the vehicle.

Tires of all different sizes and/or applications may be coated using the system 10 and/or method of the present invention. For example, large size tires, such as those used on tractor/trailers, may be coated using the system 10 and/or method of the present invention. In addition, medium size tires for automobiles, vans and/or light-duty trucks and small size tires for motorcycles, trailers, bicycles and the like may also be coated using the system 10 and/or method of the present invention.

Referring to FIG. 1, an embodiment of the system 10 of the present invention is illustrated. In the embodiment, the system 10 may be used to provide the coating 15 on the interior surface 17 of the tire 20. For example, the tire 20 shown may be suitable for use on an automobile (not shown). The tire 20 may be mounted on a rim 40. The tire 20 may be a pneumatic tire requiring inflation by air or other suitable gas, such as nitrogen. To allow inflation of the tire 20, the rim 40 may have a valve 21. The valve 21 may be a Schrader-type valve 21, a Presta-type valve 22, or other type of valve. In the illustrated embodiments of the present invention, FIGS. 1-3 and 7-9 illustrate the Schrader-type valve 21, and FIGS. 4-6 illustrate a Presta-type valve 22.

Figure 4:
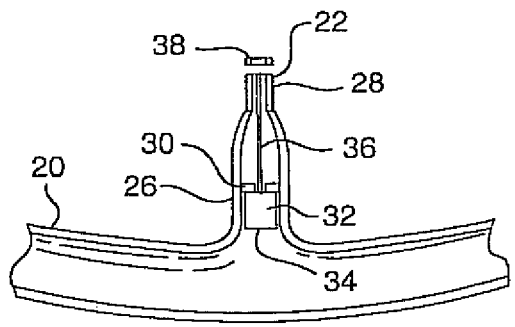
FIG. 4 illustrates a cross sectional view of a Presta-type valve, a tire and a rim taken along section line B-B of FIG. 1.
Figure 5:
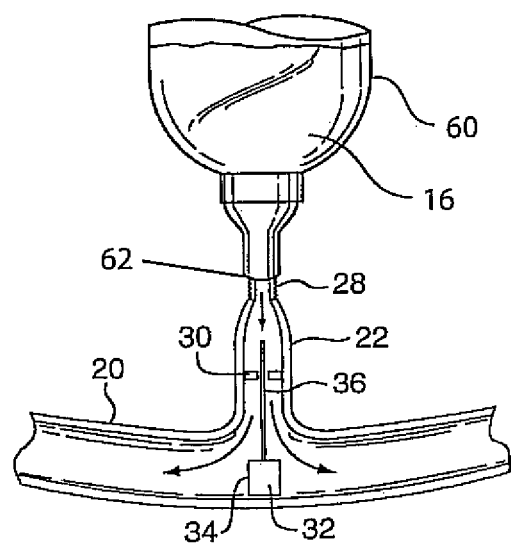
FIG. 5 illustrates a cross sectional view of the Presta-type valve, the tire and the rim taken along section line B-B of FIG. 1 with a tire coating system in accordance with an embodiment of the present invention.
Figure 6:
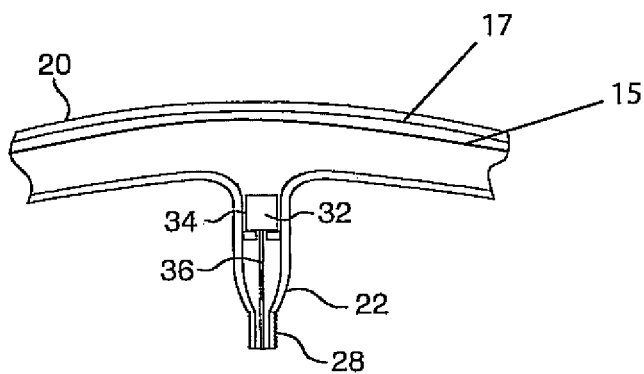
FIG. 6 illustrates a cross sectional of the Presta-type valve, the tire and the rim taken along section line B-B of FIG. 1.

Referring to the Presta-type valve 22 in FIGS. 4-6, the Presta-type valve 22 may have a valve stem 26 having a threaded upper neck portion 28 and an interior core-seating portion 30. The Presta-type valve 22 may have a valve core 32 having a stem-seating portion 34, a threaded rod 36, and a threaded cap 38. When the tire 20 may be filled with compressed air, the internal air forces the stem-seating portion 34 into sealing engagement against the core-seating portion 30, as assisted by tension in the rod 36 derived from the tightening cap 38.

Referring to the Schrader-type valve 21 shown in FIGS. 1-3 and 7-9, the Schrader-type valve 21 (also called an American valve) is a type of pneumatic tire valve used on virtually every motor vehicle in the world today. In particular, almost all automobile tires, motorcycle tires and most wider-rimmed bicycle tires use the Schrader-type valve 21.

Figure 2:
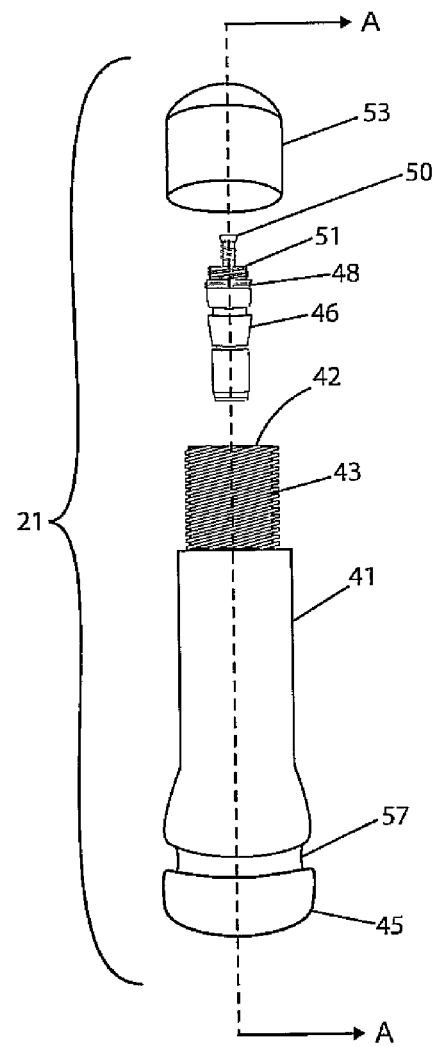
FIG. 2 illustrates an exploded side view of a Schrader-type valve in accordance with an embodiment of the present invention.
Figure 3:
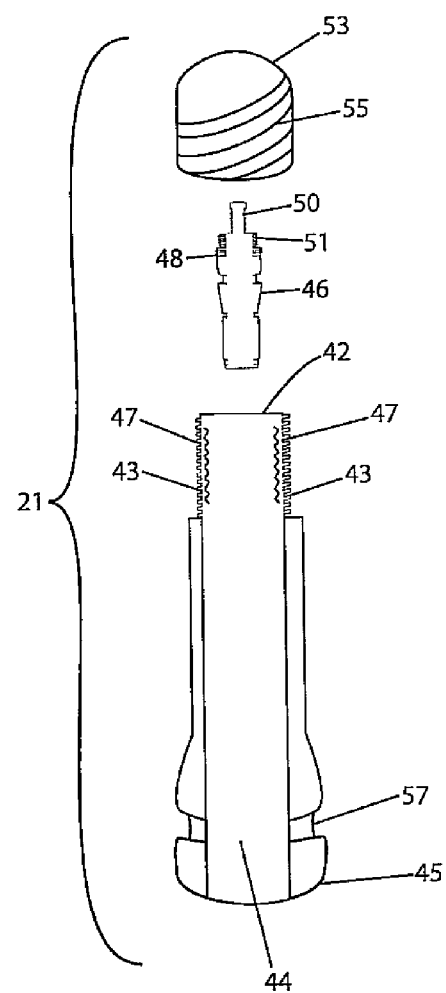
FIG. 3 illustrates an exploded cross sectional view of the Schrader-type valve taken along section line A-A of FIG. 2.

In particular, FIGS. 2 and 3 illustrate details of the Schrader-type valve 21. For example, the Schrader-type valve 21 may be generally cylindrical in shape. The Schrader-type valve 21 may have a valve stem 41. The valve stem 41 may have an inlet end 42. The inlet end 42 may have external threads 43 around the outer circumference of the inlet end 42 of the valve stem 41. The valve stem 41 may have an axial bore 44 extending from the inlet end 42 to a base 45 of the valve stem 41. The axial bore 44 may be generally cylindrical.

The Schrader-type valve 21 may have a valve core 46 located in the axial bore 44 of the valve stem 41. The axial bore 44 may have internal threads 47. The valve core 46 may have corresponding external threads 48. Thus, the valve core 46 may be threaded into the axial bore 44 of the valve stem 41. The valve core 46 may be tightened, loosened and/or removed via the threaded connection with a tool (not shown). For example, the valve core 46 may be removed to expose the axial bore 44 through the Schrader-type valve 21. Thus, the axial bore 44 formed in the Schrader-type valve 21 may allow access to the interior surface 17 of the tire 20 from outside of the tire 20.

As shown in FIGS. 2 and 3, the valve core 46 may have a poppet valve 50 assisted by a spring 51. The valve stem 41 may have a cap 53. The cap 53 may have internal threads 55. The cap 53 may be sized so that the internal threads 55 may engage the external threads 43 located at the inlet end 42 of the valve stem 41. The cap 53 may keep water, debris and/or other contaminants out of the Schrader-type valve 21. Such contaminants may affect the operation and/or performance of the poppet valve 50 and/or the spring 51 within the valve core 46. As a result, air may possibly escape from the tire 20 thereby causing under-inflation of the tire 20. Such under-inflation of the tire 20 may cause a blowout or other damage to the tire 20. Thus, the cap 53 may also keep the water, debris and/or other contaminants out of the interior surface 17 of the tire 20.

In an embodiment, the Schrader-type valve 21 may be primarily constructed of rubber and metal. For some applications, embodiments of the Schrader-type valve 21 may be all metal. In such an example, the base 45 of the valve stem 41 may be provided with exterior threads and a nut (not shown) to lock the valve stem 41 in place through a valve stem-receiving hole 55 for use in certain types of rims 30.

Moreover, the Schrader-type valve 21 may be fitted into the valve stem-receiving hole 55 in the rim 40 by other methods. For example, when the valve stem 41 and the base 45 may be constructed primarily of rubber, the Schrader-type valve 21 may be press-fitted into the valve stem-receiving hole 55. For example, the base 45 of the Schrader-type valve 21 may have a groove 57 formed in the circumference of the base 45. The groove 57 may have a reduced diameter relative to the base 45 and/or the valve stem 41 of the Schrader-type valve 21.

The base 45 of the valve stem 41 may be pressed into the valve stem-receiving hole 55 to insert the base 45 into the valve stem-receiving hole 55. The base 45 of the Schrader-type valve 21 may form an interference fit with the valve stem-receiving hole 55. The base 45 of the Schrader-type valve 21 may be deformable to press-fit the Schrader-type valve 21 into the valve stem-receiving hole 55. The groove 57 may have a diameter sized to fit within the valve stem-receiving hole 55 after the base 45 may pass through the valve stem-receiving hole 55. Thus, the Schrader-type valve 21 may be secured in the valve stem-receiving hole 55.

In an embodiment of the method of the present invention, the valve core 46 may be removed to open the axial bore 44 through the Schrader-type valve 21. The axial bore 44 formed in the Schrader-type valve 21 may allow access to the interior surface 17 of the tire 20 from outside of the tire 20. The system 10 may utilize the axial bore 44 as a conduit for applying the coating 15. The valve core 46 may be replaced after providing the coating 15 onto the interior surface 17 of the tire 20 in an embodiment of the method of the present invention.

Referring now to FIGS. 1 and 7-10, the coating 15 may be applied to the interior surface 17 of the tire 20. In an embodiment, a coating material 16 may be used to form the coating 15. The coating material 16 may be reflective, fluorescent and/or otherwise reactive to incident light. The coating material 16 may be a type of light-activated chemical, paint, pigment, dye, stain, polymer coating and/or the like. The coating material 16 may have sodium fluorescein, or some similar fluorescent or phosphorescent material as an additive to produce the effect of reflection and/or fluorescence.

In an embodiment, various colorants may be used in the coating material 16 where the desired coating 15 on the interior surface 17 of the tire 20 may be a color other than black. Thus, the coating 15 may reflect the incident light from the headlights of an oncoming vehicle encountering the tire 20 instead of absorbing the incident light. For example, such colorant in the coating material 16 may contain titanium dioxide. The colorant may preferably have titanium dioxide for an application in which a white colored coating 15 may be desired. Also, the colorant may contain, or be comprised of, titanium dioxide as a color brightener together with at least one non-black organic pigment and/or non-black inorganic pigment or dye.

Since a non-black color may be desired, colorants may be used to provide a non-black color to the composition of the coating 15. Representative examples of such colorants may be, for example, dispersions in various elastomers of selected Akrochem® Powder Colors from the Akrochem Company. In particular, yellow-colored colorants as Akrosperse 802 Yellow EPMB Diarylide Masterbatch pigment may be used with EPR (ethylene/propylene rubber). Such yellow-colored pigment may be used in combination and/or together with titanium dioxide.

In an embodiment of the system 10 and the method of the present invention, the coating 15 may be applied to the interior surface 17 of the tire 20 via the Presta-type valve 22 shown in FIGS. 4-6 and/or the Schrader-type valve 21 shown in FIGS. 1-3 and 7-9. Referring to FIGS. 4-6, the tire 20 may be prepared for receiving the coating material 16 by unscrewing the cap 38 to drop the core 32 into the position depicted in FIG. 5.

As illustrated in FIG. 5, a container 60 may hold a supply of the coating material 16. The container 60 may have a neck opening 62 with a size and shape complementary to the threaded upper neck portion 28 of the valve stem 26 for receipt of the neck opening 62 of the container 60. The neck opening 62 of the container 60 may be inserted over the threaded upper neck portion 28 of the valve stem 26. The container 60 may be squeezed to transfer the coating material 16 into the tire 20 via the Presta-type valve 22.

In an embodiment, the container 60 may contain the coating material 16 under pressure. In such an embodiment, the container 60 may be activated to dispense the coating material 16 through the neck opening 62 in a pressurized spray. After introduction of the coating material 16 into the tire 20, the system 10 may be removed. The valve core 32 may be reinstalled in a conventional manner. The tire 20 may be rotated and/or moved after the introduction of the coating material 16. Such rotation and/or movement may distribute the coating material 16 over the interior surface 17 of the tire 20. FIG. 6 illustrates the coating 15 on the interior surface 17 of the tire 20 having the Presta-type valve 22.

In another embodiment of the system 10 and the method of the present invention, the coating 15 may be applied to the interior surface 17 of the tire 20 via the Schrader-type valve 21 shown in FIGS. 1-3 and 7-9. To facilitate the introduction of the coating material 16 into the tire 20, the valve core 46 may be removed to open the axial bore 44 through the Schrader-type valve 21 as illustrated in FIG. 3. The axial bore 44 formed in the Schrader-type valve 21 may allow access to the interior surface 17 of the tire 20 from outside of the tire 20. The system 10 may utilize the axial bore 44 as a conduit for the coating material 16.

The container 60 may hold a supply of the coating material 16. The container 60 may have a tube 64. The tube 64 may be flexible or rigid. The tube 64 may have a first end 65 and a second end 66. The second end may be located in a position opposite to the first end 65. The first end 65 of the tube 64 may be connected to the container 60. The second end 66 of the tube 64 may be connected to the Schrader-type valve 21 shown in FIG. 1.

Figure 10:
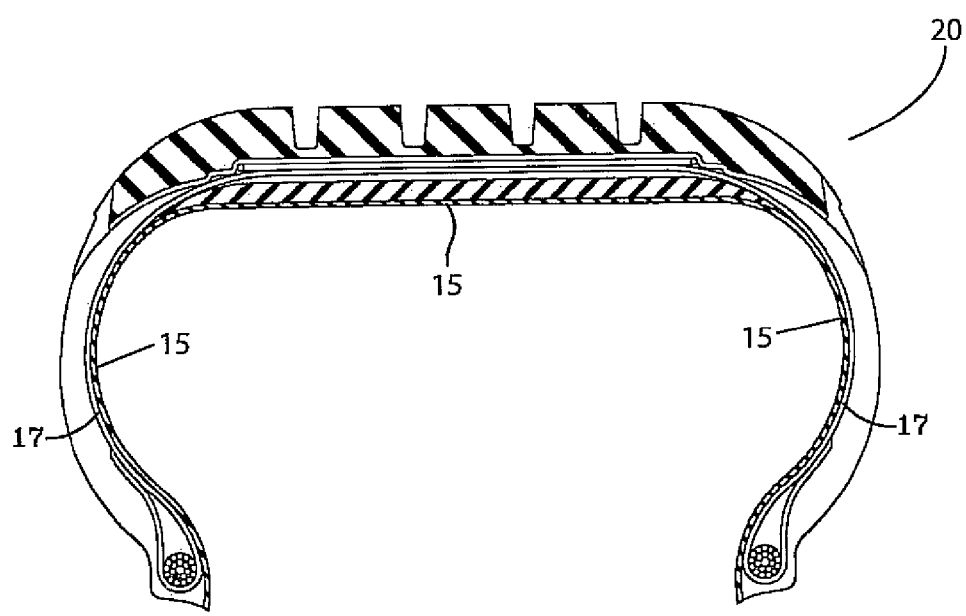
FIG. 10 illustrates a cross sectional view of the tire taken along section line D-D of FIG. 9.

The container 60 may be squeezed to expel and/or transfer the coating material 16 through the tube 64 and into the tire 20 via the Schrader-type valve 21. In an embodiment, the container 60 may contain the coating material 16 under pressure. In such an embodiment, the container 60 may be activated to dispense the coating material 16 through the tube 64 in a pressurized spray. After introduction of the coating material 16 into the tire 20. The system 10 may be removed. The valve core 46 may then be reinstalled in a conventional manner. The tire 20 may be rotated and/or moved after the introduction of the coating material 16. Such rotation and/or movement may distribute the coating material 16 over the interior surface 17 of the tire 20. FIG. 10 illustrates the coating 15 on the interior surface 17 of the tire 20.

In a further embodiment of the system 10 and the method of the present invention, the coating 15 may be applied to the interior surface 17 of the tire 20 via the Schrader-type valve 21 shown in FIGS. 1-3 and 7-9. To facilitate the introduction of the coating material 16 into the tire 20, the valve core 46 may be removed as illustrated in FIG. 3 to open the axial bore 44 through the Schrader-type valve 21. The axial bore 44 formed in the Schrader-type valve 21 may allow access to the interior surface 17 of the tire 20 from outside of the tire 20. The system 10 may utilize the axial bore 44 as a conduit for the coating material 16.

Figure 7:
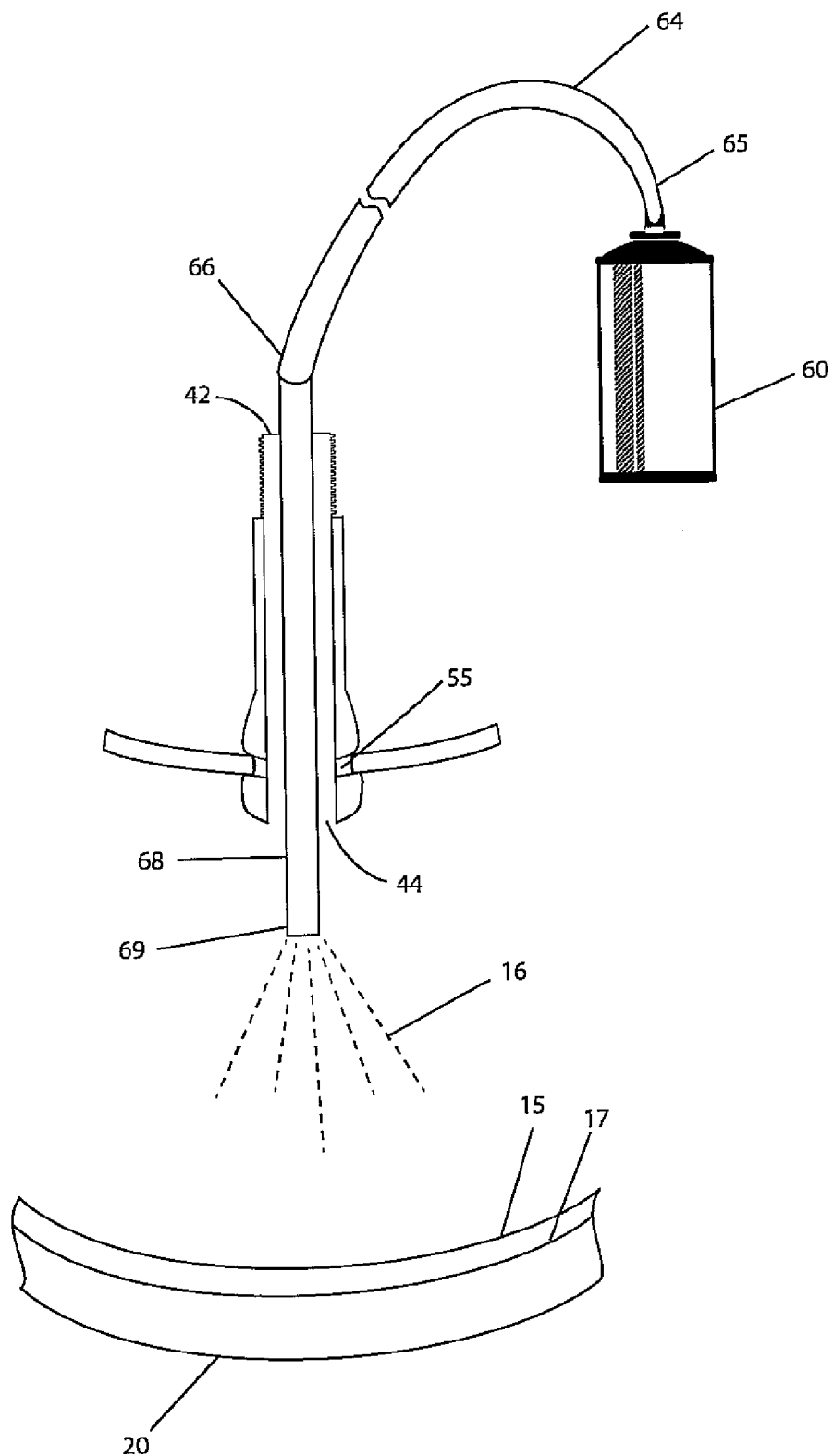
FIG. 7 illustrates a cross sectional view of the valve, the tire and the rim taken along section line B-B of FIG. 1 with the tire coating system in accordance with an embodiment of the present invention.

Referring now to another embodiment of the system 10 and the method of the present invention illustrated in FIG. 7, the container 60 may hold a supply of the coating material 16. The container 60 may have the tube 64. The tube 64 may be flexible or rigid. The first end 65 of the tube 64 may be connected to the container 60. The second end 66 of the tube 64 may be connected to a straight dispenser 68 shown in FIG. 7. The straight dispenser 68 may be a cylindrical tube sized to pass through the axial bore 44 of the valve stem 41. The straight dispenser 68 may be inserted in the inlet end 42 of the valve stem 41 and may extend through the axial bore 44 into the interior volume of the tire 20. The straight dispenser 68 may have a spray tip 69.

The container 60 may be squeezed to expel and/or transfer the coating material 16 through the tube 64. The coating material 16 may flow through the straight dispenser 68 and the spray tip 69 onto the interior surface 17 in the tire 20.

In an embodiment, the container 60 may hold the coating material 16 under pressure. In such an embodiment, the container 60 may be pressurized and activated to dispense the coating material 16 through the tube 64 in a pressurized spray through the spray tip 69 of the straight dispenser 68. The spray tip 69 may atomize the coating material 16 to spray a mist of the coating material 16 onto the interior surface 17 of the tire 20 as shown in FIG. 7.

After introduction of the coating material 16 into the tire 20, the system 10 may be removed. The valve core 46 may be reinstalled in a conventional manner. The tire 20 may be rotated and/or moved after the introduction of the coating material 16. Such rotation and/or movement may distribute the coating material 16 over the interior surface 17 of the tire 20. FIGS. 7 and 10 illustrate the coating 15 on the interior surface 17 of the tire 20.

Figure 8:
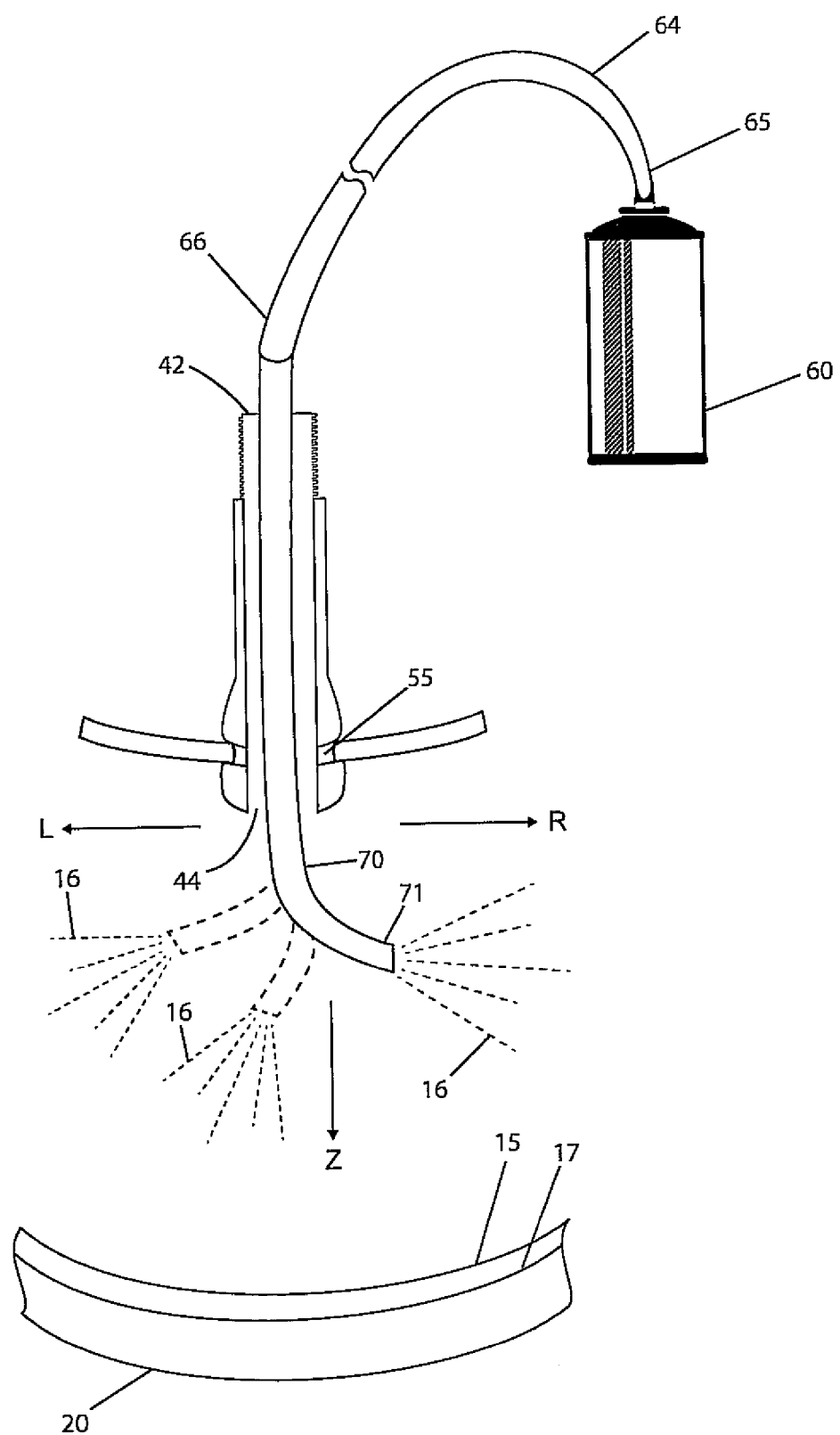
FIG. 8 illustrates a cross sectional view of the valve, the tire and the rim taken along section line B-B of FIG. 1 with a tire coating system in accordance with another embodiment of the present invention.

In yet another embodiment of the system 10 and the method of the present invention shown in FIG. 8, the coating 15 may be applied to the interior surface 17 of the tire 20 via the Schrader-type valve 21. To facilitate the introduction of the coating material 16 into the tire 20, the valve core 46 may be removed to open the axial bore 44 through the Schrader-type valve 21 as illustrated in FIG. 3. The axial bore 44 formed in the Schrader-type valve 21 may allow access to the interior surface 17 of the tire 20 from outside of the tire 20. The system 10 may utilize the axial bore 44 as a conduit for the coating material 16.

As shown in FIG. 8, the container 60 may hold a supply of the coating material 16. The container 60 may have the tube 64. The tube 64 may be flexible or rigid. The first end 65 of the tube 64 may be connected to the container 60. The second end 66 of the tube 64 may be connected to an articulating dispenser 70 shown in FIG. 8. The articulating dispenser 70 may be a cylindrical tube sized to pass through the axial bore 44 of the valve stem 41. The articulating dispenser 70 may be flexible. The articulating dispenser 70 may be inserted in the inlet end 42 of the valve stem 41 and may extend through the axial bore 44 into the interior volume of the tire 20. The articulating dispenser 70 may have a curved spray tip 71.

The curved spray tip 71 may be curved and/or articulating. For example, the curved spray tip 71 of the articulating dispenser 70 may be manipulated by a user in various directions within the interior volume of the tire 20. As shown in FIG. 8, the curved spray tip 71 may be directed to the right as indicated by arrow R. In addition, the spray tip 71 may be directed to the left as indicated by arrow L. The curved spray tip 71 may also be directed generally downward as shown and indicated by arrow Z. The curved spray tip 71 of the articulating dispenser 70 is illustrated in dashed lines in FIG. 8 to illustrate the various positions. Further, the curved spray tip 71 of the articulating dispenser 70 may be manipulated 360 degrees within the tire 20 to coat the interior surface 17 of the tire 20.

The container 60 may be squeezed to expel and/or transfer the coating material 16 through the tube 64 and the curved spray tip 71 into the tire 20. The coating material 16 may flow through the articulating dispenser 70 and the curved spray tip 71 onto the interior surface 17 in the tire 20.

In an embodiment, the container 60 may hold the coating material 16 under pressure. In such an embodiment, the container 60 may be pressurized and activated to dispense the coating material 16 through the tube 64 in a pressurized spray through the curved spray tip 71 of the articulating dispenser 70. The curved spray tip 71 may atomize the coating material 16 to spray a mist of the coating material 16 onto the interior surface 17 of the tire 20 as shown in FIG. 8.

After introduction of the coating material 16 into the tire 20, the system 10 may be removed. The valve core 46 may be reinstalled in a conventional manner. The tire 20 may be rotated and/or moved after the introduction of the coating material 16. Such rotation and/or movement may distribute the coating material 16 over the interior surface 17 of the tire 20. FIGS. 8 and 10 illustrate the coating 15 on the interior surface 17 of the tire 20.

Figure 9:
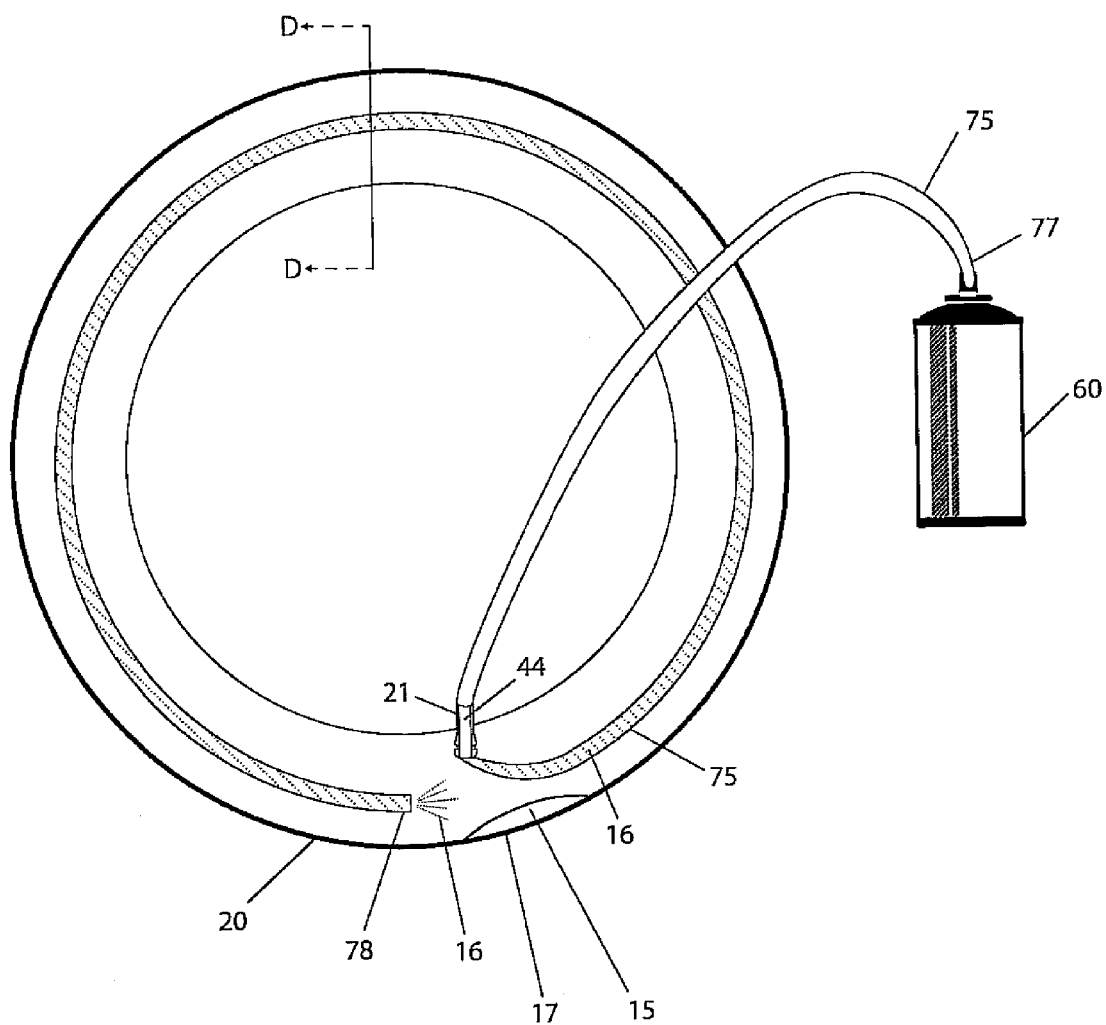
FIG. 9 illustrates a cross sectional view of the valve, the tire and the rim taken along section line C-C of FIG. 1 with a tire coating system in accordance with a further embodiment of the present invention.

Moreover, in another embodiment of the system 10 and the method of the present invention shown in FIG. 9, an extension tube 75 may be used in the system 10. As illustrated in FIG. 9, the extension tube 75 may have a first end 77 and a second end 78. The first end 77 of the extension tube 75 may be connected to the container 60. The extension tube 75 may have a diameter sized to fit through the axial bore 44 of the valve stem 41. The extension tube 75 may have a length defined from the first end 77 to the second end 78. The length of the extension tube 75 may be approximately equal to or greater than the circumference of the tire 20.

To facilitate the introduction of the coating material 16 into the tire 20, the valve core 46 may be removed to open the axial bore 44 through the Schrader-type valve 21 as illustrated in FIG. 3. The axial bore 44 formed in the Schrader-type valve 21 may allow access to the interior surface 17 of the tire 20 from outside of the tire 20. The system 10 may utilize the axial bore 44 as a conduit for the coating material 16.

The extension tube 75 may be flexible. Thus, the second end 78 of the extension tube 75 may be inserted into the inlet end 42 of the valve stem 41. The extension tube 75 may be advanced into the interior volume of the tire 20 to generally form a circle within the interior volume of the tire 20. As shown in FIG. 9, the extension tube 75 may encircle the rim 40 in a counterclockwise manner. Advancing the extension tube 75 through the valve stem 41 may cause the extension tube 75 to generally follow the interior surface 17 of the tire 20 as the extension tube 75 may be advanced. Thus, the extension tube may loop around and/or encircle the rim 40 within the interior volume of the tire 20.

The container 60 may be squeezed to expel and/or transfer the coating material 16 through the extension tube 75 and into the tire 20. As the coating material 16 may flow through the extension tube 75 and be delivered onto the interior surface 17 of the tire 20, the extension tube 75 may then be withdrawn at a uniform rate from the interior volume of the tire 20 through the axial bore 44 of the valve stem 41. The extension tube 75 may be withdrawn in a clockwise manner around the rim 40. Thus, as the extension tube 75 withdraws from the interior of the tire 20, the coating 15 may be applied to the entire circumference of the interior surface 17 of the tire 20.

In an embodiment, the container 60 may contain the coating material 16 under pressure. In such an embodiment, the container 60 may be activated to dispense the coating material 16 through the extension tube 75 in a pressurized spray through the extension tube 75. The extension tube 75 may be used in conjunction with the straight dispenser 68 and/or the articulating dispenser 70, if desired. In this manner, the coating 15 may substantially cover the interior surface 17 of the entire circumference of the tire 20. FIG. 9 shows the coating 15 on a portion of the interior surface 17 of the tire 20. As the extension tube 75 is uniformly withdrawn from the interior of the tire 20, the coating 15 may cover the entire circumference of the tire 20.

After introduction of the coating material 16 into the tire 20, the system 10 may be removed. The valve core 46 may be reinstalled in a conventional manner. The tire 20 may be rotated and/or moved after the introduction of the coating material 16. Such rotation and/or movement may distribute the coating material 16 over the interior surface 17 of the tire 20. FIGS. 9 and 10 illustrate the coating 15 on the interior surface 17 of the tire 20.

In still another embodiment of the system 10 and the method of the present invention, the coating 15 may be applied to the interior surface 17 of the tire 20 when the tire 20 may be apart from the rim 40. For example, the coating 15 may be applied to a new tire 20 before initially mounting the tire 20 on the rim 40. For example, the coating 15 may be applied to the interior surface 17 of the tire 20 during the manufacturing process of the tire 20. The manufacturer of the tire 20 may apply the coating material 16 to the interior surface 17 of the tire 20 as a production step in the manufacturing process of the tire 20. The coating 15 may be applied in an assembly line at the tire factory prior to sale and/or use of the tire 20. The manufacturer may apply the coating 15 to the interior surface 17 of the tire 20 in any manner desired.

Alternatively, the coating 15 may be applied to the interior surface 17 of the tire 20 after the tire 20 may have been dismounted and/or separated from the rim 40 for repair, for example. The method of the present invention may provide coverage of the interior surface 17 of the tire 20 since the interior volume of the tire 20 is fully accessible with the rim 40 removed.

In such embodiments, the system 10 and the method may be used without inserting the tube 64, the straight dispenser 68, the articulating dispenser 70 and/or the extension tube 75 through the axial bore 44 of the valve stem 41. For example, the container 60 of coating material 16 may be used to apply the coating 15 to the interior surface 17 of the tire 20 directly. Accordingly, the system 10 and the method may be used to coat the entire interior surface 17 of the tire 20 due to the full access to the interior volume of the tire 20. FIG. 10 illustrates the coating 15 on the interior surface 17 of the tire 20.

FIG. 10 illustrates a cross sectional view of the tire 20 without the rim 40. As shown, the coating 15 may cover the interior surface 17 of the tire 20 so that the coating 15 may be exposed and/or visible in the event of a failure of the tire 20. Thus, the incident light from the headlights of an oncoming vehicle may impinge upon the exposed coating 15 which may provide a reflective and/or fluorescent surface. The reflective nature of the coating 15 may enable the operator of the oncoming vehicle to see the destroyed tire 20 and avoid driving over the tire 20 to avoid damage to the vehicle and/or prevent an accident.

Moreover, the present invention is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

I claim:

1. A method for coating a tire wherein the tire has a valve connected to an interior of the tire and a valve core located in the valve, the method comprising the steps of:
    connecting a source of coating material to the valve;
    inserting the source of the coating material through the valve;
    propelling the coating material through the valve; and
    applying the coating material to the interior of the tire.

2. The method of claim 1 wherein the coating material is reflective to light.

3. The method of claim 1 wherein the coating material is a colorant.

4. The method of claim 1 wherein the coating material is fluorescent.

5. The method of claim 1 further comprising the step of:
    removing the valve core from the valve before connecting the source of coating material to the valve.

6. The method of claim 1 further comprising the step of:
    moving the tire to disperse the coating material within the interior of the tire.

7. The method of claim 1 wherein the source of the coating material is a pressurized container.

8. The method of claim 1 further comprising the step of:
    pressurizing the source of the coating material.

9. A method for coating a tire wherein the tire has a valve connected to an interior of the tire and a valve core located in the valve, the method comprising the steps of:
    inserting a tube connected to a source of coating material through the valve;
    propelling the coating material through the valve;
    applying the coating material to the interior of the tire.

10. A method for coating a tire wherein the tire has a valve connected to an interior of the tire and a valve core located in the valve, the method comprising the steps of:
    inserting a source of coating material through the valve;
    propelling the coating material through the valve;
    atomizing the coating material; and
    applying the coating material to the interior of the tire.

11. A method of coating an interior of a tire mounted on a rim comprising the steps of:
    connecting a first end of a tube to a source of coating material wherein the tube has a second end located in a position opposite to the first end of the tube wherein the tube has a length defined from the first end to the second end;
    inserting the second end of the tube into the interior of the tire wherein the tube encircles the rim;
    transferring the coating material from the source of coating material through the length of the tube into the interior of the tire; and
    withdrawing the tube from the tire wherein the tube moves along a circumference of the interior of the tire.

12. The method of claim 11 wherein the tire has a valve providing access to the interior of the tire, the method further comprising the step of:
    inserting the second end of the tube through the valve into the interior of the tire.

13. The method of claim 11 further comprising the step of:
    attaching a directional sprayer to the second end of the tube.

* * * * *